(12) United States Patent
Caillot et al.

(10) Patent No.: US 11,697,398 B2
(45) Date of Patent: Jul. 11, 2023

(54) BENDING MEMBER FOR WIPER BLADE

(71) Applicant: Valeo Systèmes d'Essuyage, Le Mesnil Saint Denis (FR)

(72) Inventors: Gérald Caillot, Le Mesnil Saint Denis (FR); Jean-Michel Jarasson, Le Mesnil Saint Denis (FR); Vincent Izabel, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 243 days.

(21) Appl. No.: 16/493,115

(22) PCT Filed: Mar. 13, 2018

(86) PCT No.: PCT/EP2018/056309
§ 371 (c)(1),
(2) Date: Sep. 11, 2019

(87) PCT Pub. No.: WO2018/167102
PCT Pub. Date: Sep. 20, 2018

(65) Prior Publication Data
US 2020/0114879 A1    Apr. 16, 2020

(30) Foreign Application Priority Data

Mar. 14, 2017 (FR) ........................................ 1752084

(51) Int. Cl.
*B60S 1/38* (2006.01)

(52) U.S. Cl.
CPC .......... *B60S 1/3875* (2013.01); *B60S 1/3874* (2013.01); *B60S 1/38* (2013.01); *B60S 1/381* (2013.01);
(Continued)

(58) Field of Classification Search
CPC ........ B60S 1/38; B60S 1/3874; B60S 1/3875; B60S 1/3881; B60S 1/3882; B60S 1/381;
(Continued)

(56) References Cited

U.S. PATENT DOCUMENTS 3,114,926 A * 12/1963 Deibel ................. B60S 1/3801
15/250.451
3,881,214 A *  5/1975 Palu ...................... B60S 1/3881
15/250.48
(Continued)

FOREIGN PATENT DOCUMENTS

DE  102008012466 A1  9/2009
FR      2867738 A1  9/2005
(Continued)

OTHER PUBLICATIONS

International Search Report and Written Opinion in corresponding International Application No. PCT/EP2018/056309, dated Jun. 12, 2018 (12 pages).
(Continued)

*Primary Examiner* — Gary K. Graham
(74) *Attorney, Agent, or Firm* — Osha Bergman Watanabe & Burton LLP

(57) ABSTRACT

The invention concerns a wiper blade for a vehicle, comprising at least one wiper strip intended to come to bear on a glazed surface and at least one bending member (1) housed in a support, the wiper strip being held by the support, the bending member (1) being configured to generate curvature in the wiper blade, the bending member (1) being arranged in the form of a longitudinally extending strip, the strip comprising, seen in cross-section, an intermediate portion (2) arranged between two lateral portions (3*a*, 3*b*) of the strip, characterized in that a first thickness (12) of the
(Continued)

Figure 1:
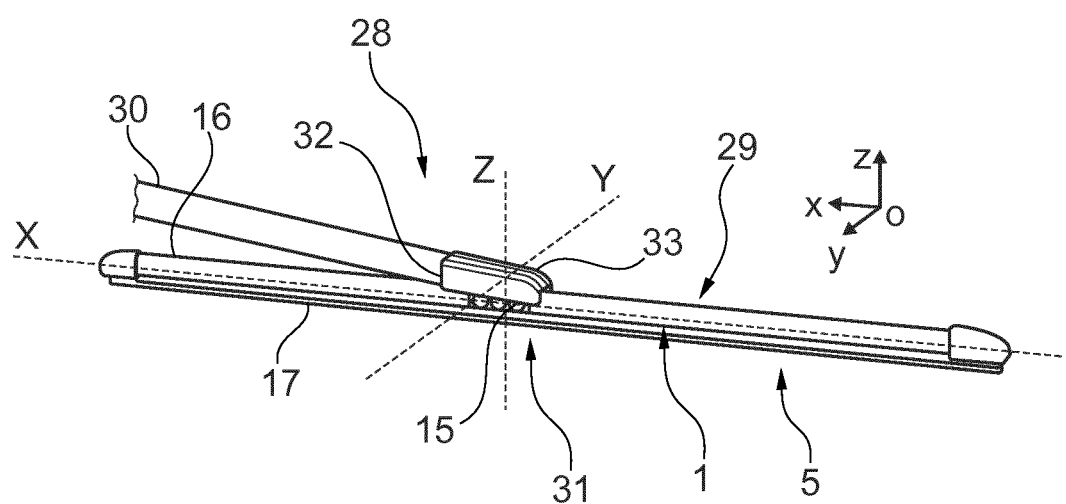

intermediate portion (2) is less than a second thickness (13) of at least one of the lateral portions (3a, 3b).

12 Claims, 4 Drawing Sheets

(52) U.S. Cl.
CPC ............ *B60S 1/3805* (2013.01); *B60S 1/3881* (2013.01); *B60S 2001/382* (2013.01); *B60S 2001/3812* (2013.01); *B60S 2001/3817* (2013.01)

(58) Field of Classification Search
CPC ...... B60S 2001/3812; B60S 2001/3817; B60S 2001/3818; B60S 1/3879; B60S 1/3805; B60S 2001/382
USPC .................. 15/250.43, 250.451, 250.361
See application file for complete search history.

(56) References Cited

U.S. PATENT DOCUMENTS

| | | | | |
|---|---|---|---|---|
| 7,690,073 B2* | 4/2010 | Marmoy | ............... | B60S 1/3856 15/250.32 |
| 8,261,404 B2* | 9/2012 | Wunsch | ................... | B60S 1/38 15/250.43 |
| 8,307,493 B2* | 11/2012 | Boland | ................. | B60S 1/3881 15/250.32 |
| 9,896,065 B2* | 2/2018 | Caillot | ................. | B60S 1/3881 |
| 2003/0126713 A1* | 7/2003 | Acx | ...................... | B60S 1/3879 15/250.451 |
| 2007/0251044 A1* | 11/2007 | Adriaensen | ........... | B60S 1/3877 15/250.351 |
| 2013/0333150 A1* | 12/2013 | Crabbe | .................... | B60S 1/38 15/250.361 |
| 2014/0317872 A1* | 10/2014 | Caillot | ................. | B60S 1/3881 15/250.06 |

FOREIGN PATENT DOCUMENTS

| | | |
|---|---|---|
| WO | 2006/024567 A1 | 3/2006 |
| WO | 2008/069464 A1 | 6/2008 |
| WO | 2015/158398 A1 | 10/2015 |

OTHER PUBLICATIONS

Office Action in corresponding European Application No. 18 710 871.7, dated Apr. 1, 2021 (5 pages).

* cited by examiner

BENDING MEMBER FOR WIPER BLADE

The present invention concerns a bending member for a wiper blade. It relates more particularly to the field of wiping glazed surfaces of a vehicle, in particular a windshield or a rear window of a motor vehicle.

Vehicles are routinely equipped with a wiper system for wiping and washing the windshield or the rear window to prevent disturbance to the view that the driver has of their environment. These wipers are conventionally driven by a driving arm effecting an angular to-and-fro movement and including elongate wiper blades carrying wiper rubbers made from an elastic material. These rubbers rub against the glazed surface and evacuate water out of the field of view of the driver. The wiper blades are produced either, in a conventional version, in the form of articulated swing-arms that retain the wiper rubber at a plurality of discrete locations or, in a more recent flat blade version, a flexible element that retains the wiper rubber over the whole of its length. In this second solution, the wiper blade is attached to the rotating driving arm of the wiper system by an assembly consisting of a connector and an adapter. The invention relates more particularly to the field of wiper blades of the second type.

The flexible element distributes a bearing force generated by the driving arm over the whole of the length of the wiper blade. That distribution is therefore impacted by the length of the wiper blade. It is therefore known to use flexible elements that are more or less flexible as a function of the length of the wiper blade concerned. Such adaptation of flexibility is effected by adapting the thickness of the flexible element to match it to the components that are secured to that flexible element. This is in particular the case of the connector.

The manufacturer of these wiper blades must therefore produce, manage and handle the logistics of a plurality of components specifically adapted to different flexible element thicknesses.

This represents a major disadvantage and the invention proposes to reduce the impact of this kind of disadvantage.

The invention therefore consists in a vehicle wiper blade including at least one wiper rubber intended to come to bear on a glazed surface and at least one bending member housed in a support, the wiper rubber being retained by the support, the bending member being configured to generate a curvature of the wiper blade, the bending member being in the form of a longitudinally extending strip, the strip including, seen in cross section, an intermediate portion disposed between two lateral portions of the strip. That bending member has its first thickness of the intermediate portion less than a second thickness of at least one of the lateral portions.

According to one embodiment of the invention, the first thickness of the intermediate portion of the strip may be less than the second thickness of each of the lateral portions.

This strip may have a length substantially equivalent to the length of the wiper blade into which the bending member is integrated. When it is integrated into a wiper blade, the lateral portions of this bending member form an attachment zone for a connector by means of which a wiper rubber is attached to a driving arm of the wiper blade.

The second thickness of the lateral parts is advantageously identical from one wiper blade to another whatever the length of the wiper blade, thus enabling standardization of the connector. For its part a first thickness is determined to match the flexibility of the wiper blades on which this bending member is mounted. It is therefore possible to use the same type of connector, referred to hereinafter as a "standard connector", for different bending members used for wiper blades less than 650 mm long and for wiper blades more than 650 mm long.

It is clear that this "threshold" length of 650 mm is given by way of example only and should not be seen as limiting on the present invention.

According to a first embodiment of the present invention, the bending member includes at least one transition regularly disposed between the intermediate portion and at least one of the lateral portions, advantageously both lateral portions.

According to a second embodiment of the present invention, the bending member includes at least one transition between the intermediate portion and at least one of the lateral portions, advantageously both lateral portions, produced by a shoulder.

The transition is therefore gentle in the first embodiment and sudden in the second embodiment.

According to one example of the first embodiment, the intermediate portion of the bending member is delimited by a first face that has a concave profile seen from the exterior of the bending member. This intermediate portion of the bending member may be delimited by a second face opposite the first face with respect to a first plane of symmetry passing through the center of the first thickness. The second face then has a concave profile seen from the exterior of the bending member. According to any one of the embodiments of the invention, the second thickness is identical, apart from the manufacturing tolerance, at each of the two lateral portions of the strip. At least one lateral portion of the bending member according to the invention, and advantageously both lateral portions, include(s) a longitudinal edge surface of the strip, two tops and two chamfers that connect each top to the longitudinal edge surface. The second thickness is therefore measured between the two tops of the same lateral portion.

According to one embodiment of the present invention, the strip has a symmetry of shapes with respect to the first plane of symmetry that intersects the strip within its thickness. The strip may optionally also have a symmetry of shapes with respect to a second plane of symmetry perpendicular to the first plane of symmetry and passing through the center of the first thickness.

The bending member according to the invention may advantageously include a layer of an anti-corrosion material that extends transversely over the strip at least between the two lateral portions. According to one aspect of the present invention, the layer of anti-corrosion material may surround the strip. That layer may for example be delimited by a plane surface able to pass through the tops of two lateral portions that are symmetrical with respect to the second plane of symmetry. That layer then fills the cavity generated by the difference between the second thickness and the first thickness.

The plane surface delimiting this layer may for example facilitate the subsequent application of a heating film to the bending member. In fact, a plane surface will enable better adhesion of the heating film than a curved surface.

According to the invention, the strip may have a maximum length equal to 650 mm. The objective of the bending member according to the invention being to improve the flexibility of the wiper blades, it may for example be used on so-called "short" wiper blades having a length less than 650 mm. For wiper blades of greater length the aim will rather be to stiffen the blade by integrating into it other types of bending member, whilst retaining the same standard connector.

The bending member according to the present invention may for example include a spine housed in a support, the wiper rubber then being retained by the support.

According to another variant embodiment, the wiper rubber is carried by at least one bending member, in particular being glued to that bending member.

In any of the embodiments, the wiper blade according to the present invention may include a single bending member.

That bending member may equally include two longitudinal strips each housed in a groove formed in the wiper rubber, for example formed between a heel-piece and a wiping lip of the rubber.

The invention is also directed to a set of wiper blades including at least one first wiper blade and one second wiper blade, each wiper blade including at least one wiper rubber intended to come to bear on a glazed surface, at least one bending member and a connector intended to connect the wiper blade to a driving arm, the wiper rubber and the connector of the two wiper blades being of identical conformation, the bending member of the first wiper blade being able to have a globally rectangular section. According to the invention, the second wiper blade is for its part one according to any one of the embodiments referred to hereinabove.

According to one embodiment of the present invention, the first wiper blade of this set of wiper blades has a length of at least 650 mm while the second wiper blade has a length of at most 650 mm.

According to one embodiment of the present invention, a thickness of the bending member of the first wiper blade is substantially identical to the second thickness of at least one of the lateral portions of the bending member equipping the second wiper blade. This thickness may for example be measured in a cross section plane passing through the connector of each of the wiper blades.

It is clear here that the set of wiper blades aims to provide wiper blades covering a large portion of the installed base of motor vehicles, this set of wiper blades being for example intended for the motor vehicle spares market, otherwise known as the retrofit market.

Figure 2A:
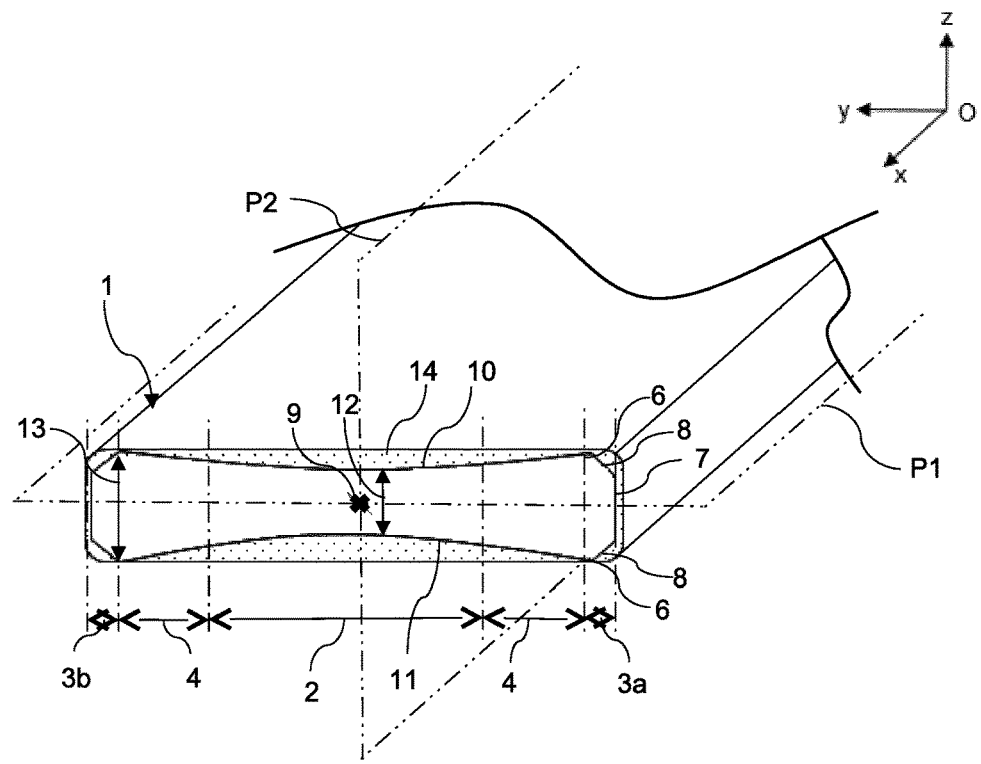
Figure 2B:
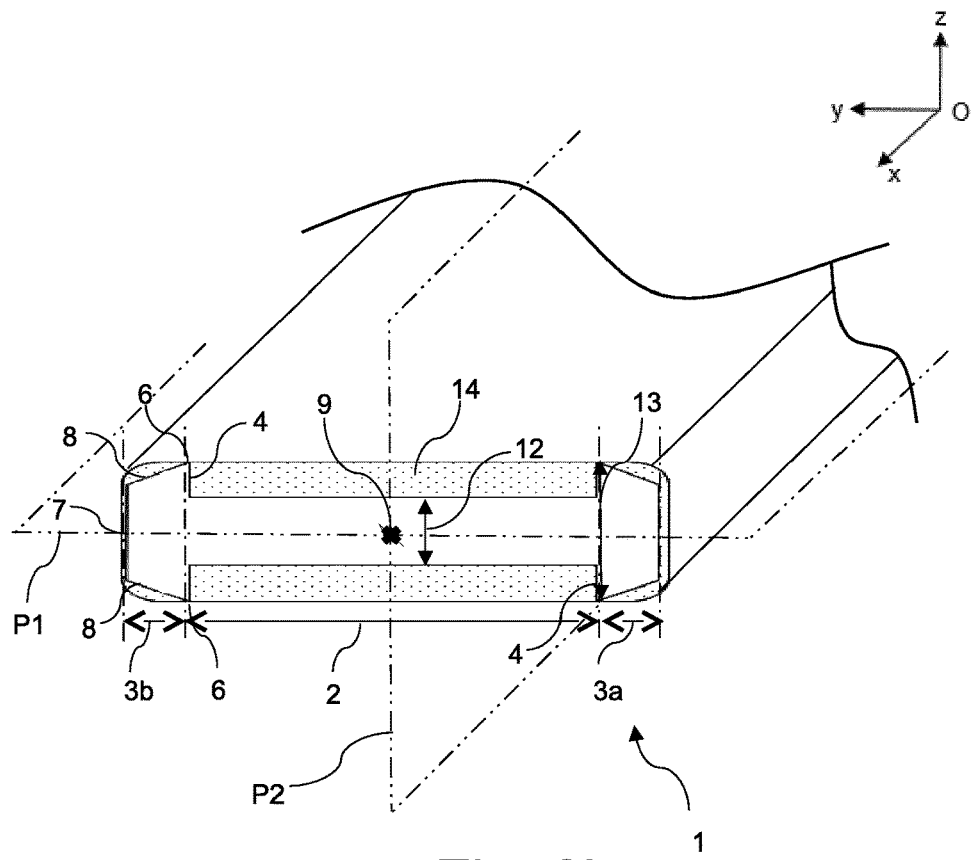
Figure 3:
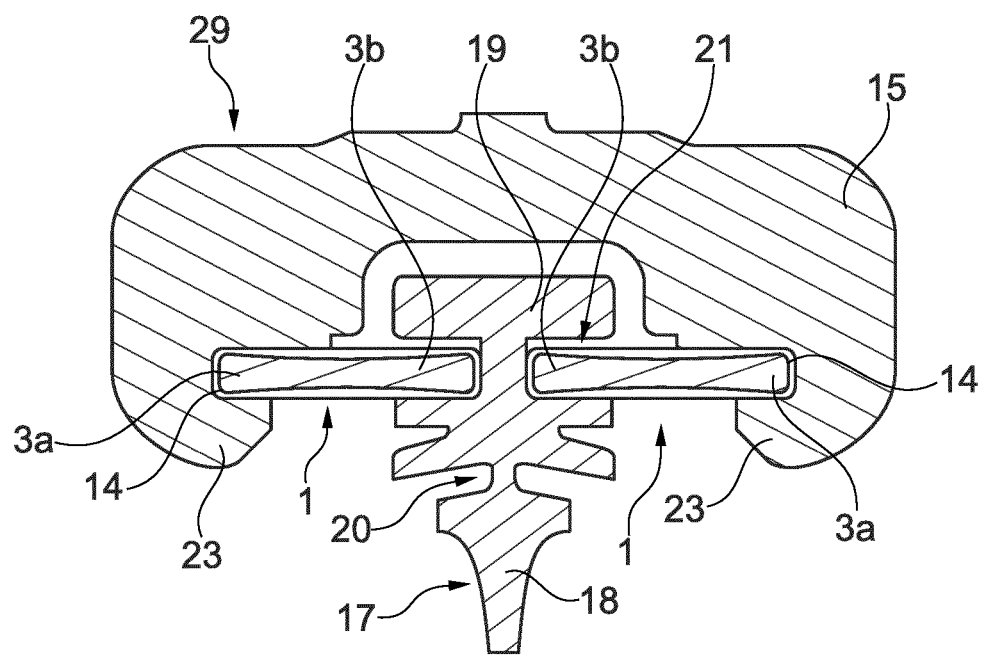
Figure 4:
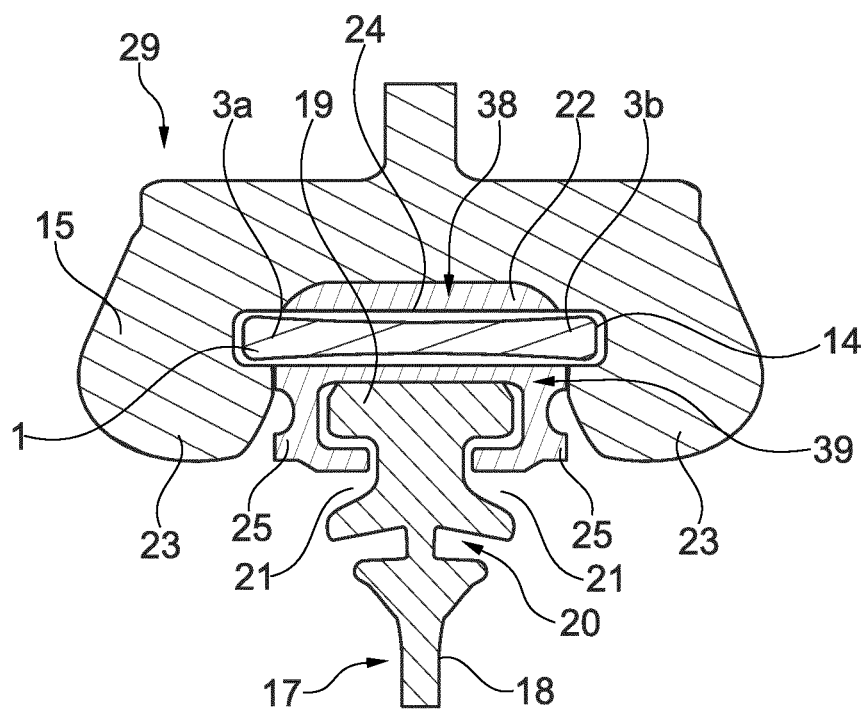
Figure 5:
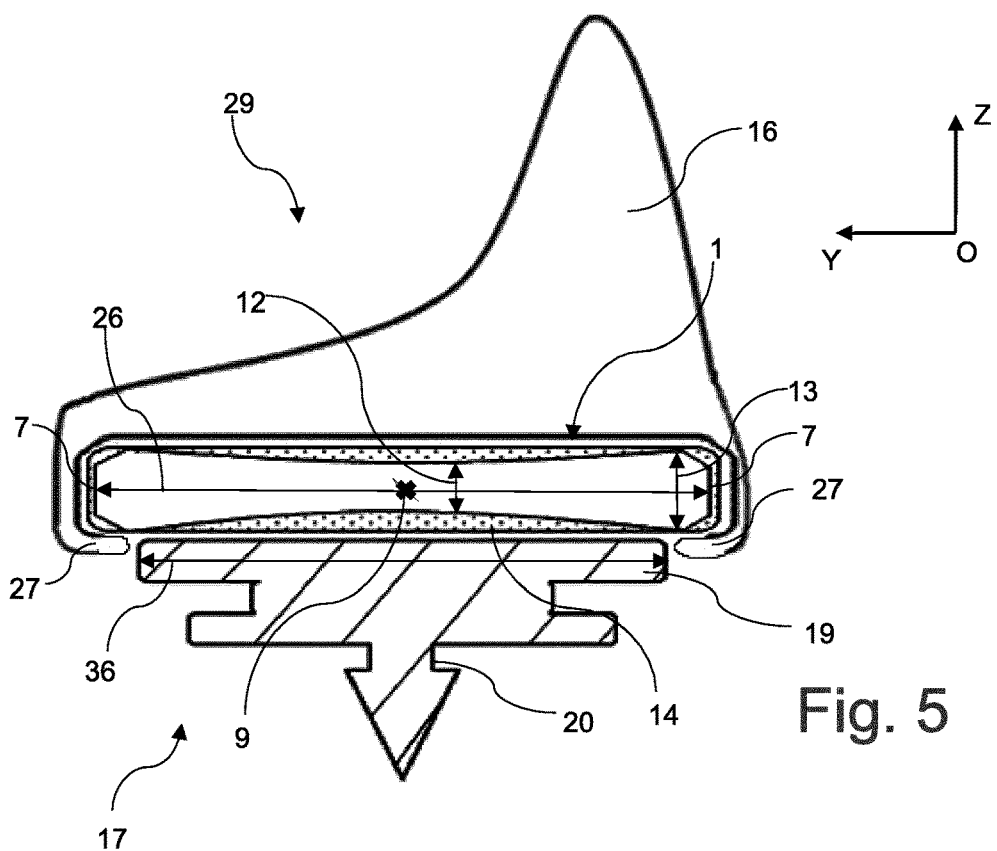
Figure 6:
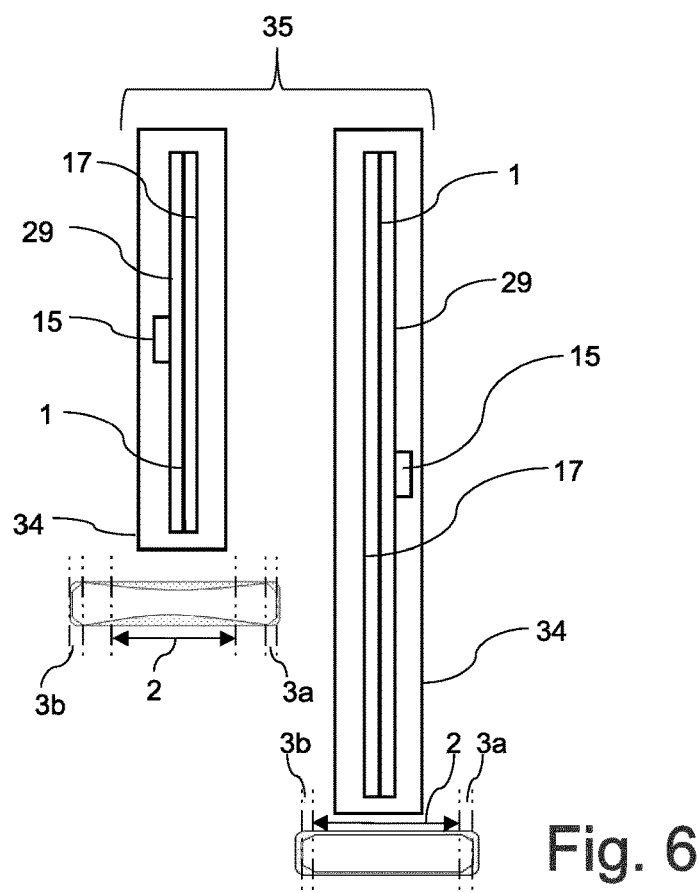

Other features, details and advantages of the invention will emerge more clearly on reading the description given hereinafter by way of illustration with reference to drawings in which:

FIG. 1 is a perspective view of a wiper system according to one embodiment of the invention, FIGS. 2a and 2b are diagrammatic representations in cross section of a bending member produced in accordance with two embodiments of the present invention, FIGS. 3 to 5 are diagrammatic representations in cross section of various types of wiper blades including the bending member according to the invention, FIG. 6 is a diagrammatic representation of a set of wiper blades according to the present invention.

In the remainder of the description, the terms longitudinal and transverse refer to the orientation of the bending member when integrated into a wiper blade. The longitudinal direction corresponds to a direction of longitudinal extension of the bending member, that longitudinal direction being parallel to an axis Ox of an orthonormal system of axes shown in FIG. 1 for example. A transverse direction corresponds to a direction parallel to an axis Oy of that orthonormal system of axes, the axis Oy being perpendicular to the axis Ox. A vertical direction corresponds to a direction parallel to an axis Oz of the orthonormal system of axes, the axis Oz being perpendicular to the axis Ox and to the axis Oy.

The cross sections referred to hereinafter are for their part produced in section planes perpendicular to the axis Ox of the orthonormal system of axes in which the axes Oy and Oz of that orthonormal system of axes are inscribed.

FIGS. 2a to 5 described hereinafter represent cross sections of the bending member alone or integrated into the wiper blade and produced in accordance with various embodiments of the present invention. Note that this bending member takes the form of a longitudinally extending metal strip.

In FIG. 1 is shown a wiper system 28 configured to be installed on a motor vehicle and enabling evacuation of water and/or dirt present on a glazed surface, in particular a rear window or a windshield of that automobile vehicle. The wiper system 28 includes a driving arm 30 able to effect an angular to-and-fro movement along and above the glazed surface.

The wiper system 28 also includes a wiper blade 29 that extends along a longitudinal axis X parallel to the axis Ox. The wiper blade 29 includes at least one air deflector 16, a wiper rubber 17 and a bending member 1, also termed a spine. According to the present invention, that bending member 1 takes the form of a longitudinally extending strip parallel to the axis Ox and lying in a plane Oxy.

The air deflector 16 is designed to transform a pressure applied by a flow of air circulating along the glazed surface into a force with which the wiper blade 29 bears against the glazed surface of the motor vehicle. The wiper rubber 17 is the part of the wiper blade 29 in direct contact with the glazed surface to evacuate water and/or dirt present on the latter. The air deflector 16, the wiper rubber 17 and the bending member 1 form a semi-rigid assembly 5 that is carried by a connection device 31 disposed between the driving arm 30 and the semi-rigid assembly 5.

The device 31 provides a mechanical connection between an end part 32 of the driving arm 30 and the wiper blade 29 and therefore enables separation of the wiper blade 29 from the driving arm 30 with a view to replacing the wiper blade 29.

The connection device 31 of the present invention generally includes an adapter 33 and a connector 15, that connector 15 being configured to grip the bending member 1 as described hereinafter.

FIGS. 2a and 2b show in cross section two embodiments of a bending member 1 according to the invention. Regardless of the embodiment, that bending member 1 includes an intermediate portion 2 disposed between two lateral portions 3a and 3b, the intermediate portion 2 having a first thickness 12 less than a second thickness 13 of the lateral portions 3a, 3b.

Regardless of the embodiment of the invention, the first thickness 12 is measured between a first face 10 and a second face 11 of the bending member 1 in the vicinity of a center 9 of that first thickness 12.

Likewise, the second thickness 13 is measured in line with two tops 6 of the same lateral portions 3a, 3b described hereinafter and that second thickness 13 is identical for each of the lateral portions 3a, 3b of the same bending member 1.

These first and second thicknesses 12, 13 are constant all along the longitudinal extension direction of the bending member 1.

The bending member 1 according to the present invention has two planes of symmetry: a first plane P1 of symmetry in which are inscribed the axes Ox and Oy of the orthonormal system of axes as shown in FIG. 2a and a second plane P2 of symmetry in which are inscribed the axes Ox and Oz of that orthonormal system of axes. These two planes P1 and P2 of symmetry are mutually perpendicular and pass through the center 9 of the first thickness 12 as shown in FIGS. 2a and 2b.

A first lateral portion 3a is therefore symmetrical with respect to the second plane P2 of symmetry to a second lateral portion 3b, each of these lateral portions 3a, 3b then having, in a symmetrical manner, a longitudinal edge surface 7 of the strip, two tops 6 and two chamfers 8 connecting each of the tops 6 to the longitudinal edge surface 7. It may be noted that all of these elements are on the bending member 1 whether it is produced in accordance with a first embodiment shown in FIG. 2a or in accordance with a second embodiment shown in FIG. 2b.

Moreover, this bending member 1 features a transition 4 between the intermediate portion 2 and each of the lateral portions 3a, 3b.

According to the first embodiment shown in FIG. 2a, the transition 4 is regular and progressive. According to this first embodiment, the bending member 1 has a first face 10 having a concave profile as seen from the exterior of the bending member 1. The concave profile of this first face 10 delimits a first exterior edge of the bending member 1 seen in cross section.

This bending member 1 also has a second face 11, symmetrical with the first face 10 with respect to the first plane P1 of symmetry. This second face 11 therefore also has a concave profile as seen from the exterior of the bending member 1 that delimits a second exterior edge of the bending member 1 seen in cross section.

According to the second embodiment shown in FIG. 2b, the transition 4 is produced by a steep shoulder, that is to say a step formed by two right-angled bends. According to this second embodiment, the first face 10 and the second face 11 of the bending member 1 are also symmetrical with respect to the first plane P1 of symmetry and each has a flat and regular profile along the longitudinal extension direction of the bending member 1.

The bending member 1 according to the present invention is intended to be integrated into different wiper blades as shown in FIGS. 2 to 5 and in particular into so-called "short" wiper blades, that is to say ones having a length less than 650 mm. The first thickness 12 of the intermediate portion 2 is determined so that once integrated into the wiper blade this bending member 1 enables adaptation of the flexibility of these short blades. This first thickness is therefore between 0.6 mm and 1.25 mm inclusive.

Each of the lateral portions 3a, 3b defines an attachment zone for a wiper blade connector. In order to enable standardization of that connector, the second thickness 13 of the lateral parts 3a, 3b may be identical from one short wiper blade length to another length. A standardized connector is therefore adapted to be fitted to all of the bending members 1 produced in accordance with the invention, whichever embodiment is chosen.

In order to improve the resistance to wear of the bending member 1, the latter may optionally be covered with a layer 14 of an anti-corrosion material.

According to the embodiments shown, that layer 14 may cover the periphery of the bending member 1 entirely. According to these examples, the layer 14 passes each of the tops 6 of the lateral portions 3a, 3b and is able to fill a cavity generated by the difference in thickness between the intermediate portion 2 and the lateral portions 3a, 3b.

According to another variant embodiment of the present invention not shown here, this layer 14 may equally cover only a part of the first and second faces 10, 11 of the bending member 1. The layer 14 may for example cover only the intermediate portion 2 of the bending member 1.

In all embodiments of the invention, this layer 14 of anti-corrosion material may advantageously be delimited by a plane surface, making it possible to facilitate the subsequent application of a heating film that will adhere better to a plane surface than to a curved surface.

That heating film may for example include an electrical track made from a heating resistive material and a thin film of synthetic material to support the track. The electrical track is then situated on an upper face of the synthetic film a lower face of which is glued to the plane surface delimited by the layer 14 of anticorrosion material that fills the cavity generated by the difference in thickness between the intermediate portion 2 and the lateral portions 3a, 3b. According to different embodiments, this heating film may for example extend over all the length of the strip or over only a part of that length.

FIGS. 3 to 5 show different embodiments of the wiper blade 29 according to the present invention. As mentioned above, all of these figures represent cross sections of these wiper blades 29.

FIGS. 3 and 4 are cross sections at the level of a zone including the connector 15 of the wiper blade 29, whereas FIG. 5 is a cross section along the wiper blade 29 outside the zone including the connector 15 and the wiper blade 29.

All of the wiper blades 29 described hereinafter are shown integrating the bending member 1 produced in accordance with the first embodiment as shown in FIG. 2a, but it is understood that this bending member 1 could equally be produced in accordance with the second embodiment shown in FIG. 2b without that impacting its functionalities.

In all embodiments, the wiper blade 29 includes at least the wiper rubber 17 including a heel-piece 19 of substantially rectangular shape and a wiper lip 18 intended to come to bear on a glazed surface. Note the presence at the junction between this heel-piece 19 and this lip 18 of at least one groove 21 that is able for example to receive at least one bending member 1.

The wiper lip 18 may also feature a hinge 20 configured to improve the mobility of the wiper lip 18. That hinge 20 in particular enables the wiper lip 18 to flip over upon changing the wiping direction of the wiper blade 29 and thereby enables the wiper lip 18 to wipe effectively the glazed surface into opposite directions of movement.

FIG. 3 shows a first embodiment of a wiper blade 29 according to the present invention. That wiper blade 29 includes the connector 15, the wiper rubber 17 and two bending members 1 according to the invention, those bending members 1 being coplanar here.

According to this first embodiment, the connector 15 includes two hooks 23 each configured to grip a bending member 1 at the level of its first lateral portions 3a. These hooks 23 therefore include a gap of a size equivalent to the second thickness 13 of the lateral portions 3a, 3b.

This second thickness 13 being identical in each of the embodiments of the bending member 1 according to the present invention, the connector 15 and more particularly its hooks 23 can be standardized, so that a single type of connector 15 may be used with different bending members 1 and in particular with a plurality of lengths of the bending member 1 according to the invention.

For its part the second lateral portion 3b of each bending member 1 comes to be housed in the groove 21 situated at the junction between the heel piece 19 and the lip 18 of the wiper rubber. According to this embodiment of the present invention, these two lateral portions 3b of each bending member 1 therefore participate in retaining the wiper rubber 17.

The bending members 1 according to the present invention in particular enable generation of a curvature of the wiper blade 29 in which they are integrated whilst adapting their flexibility to their length.

FIG. 4 shows a second embodiment of a wiper blade 29 according to the present invention. That wiper blade 29 includes the connector 15, the wiper rubber 17, a support 22 and a single bending member 1 produced in accordance with the present invention.

The support 22 includes an upper part 38 in which is formed a tubular cavity 24 adapted to receive the bending member 1 and a lower part 39 including two lugs 25 configured to grip the wiper rubber 17 at the level of the grooves 21 described hereinabove.

FIG. 4 shows a cross section of the wiper blade 29 at the level of the connector 15. At the level of that connector 15, the upper part 38 of the support 22 includes openings that enable the hooks 23 of the connector 15 to grip the bending member 1.

The dimensions of these hooks 23 are determined to grip the lateral portions 3a, 3b of the bending member 1. According to this second embodiment, the wiper blade 29 shown includes a single bending member 1 and the hooks 23 of the connector 15 therefore come to grip each of the lateral portions 3a, 3b of that bending member 1.

According to one embodiment, the support 22 may extend over at least a length of the strip and advantageously over all the length of the strip, the bending member 1 thus being completely housed in the tubular cavity 24 of that support 22. The support 22 therefore and advantageously enables protection of the bending member 1 from the outside environment whilst providing a mechanical connection between the wiper rubber 17 and the bending member 1.

This support 22 may be made from a synthetic material for example.

The bending member 1 may optionally be covered with a layer 14 of anti-corrosion material as described hereinabove.

As mentioned above, FIG. 5 shows a third embodiment of the wiper blade 29 according to the present invention. That wiper blade 29 is shown in cross section outside the zone including the connector, that is to say in a half-length of the wiper blade 29 between the connector and a longitudinal end of the wiper blade 29.

This figure shows moreover an embodiment in which the bending member 1 according to the invention is integrated into a wiper blade 29 including an air deflector 16.

That air deflector 16 may for example be made from a flexible material in order to be able to follow the deformations of the wiper rubber 17 linked to the shape of the glazed surface to be wiped as well as the curvature of the wiper blades 29 generated by the bending member or members 1 according to the present invention.

According to the third embodiment of the present invention shown in FIG. 5, the wiper blade 29 includes the wiper rubber 17, a single bending member 1 according to the present invention and the air deflector 16 described above.

According to this embodiment, the wiper rubber 17 is carried directly by the bending member 1 according to the present invention. That bending member 1 can therefore be glued to the heel-piece 19 of the wiper rubber 17.

In order to facilitate gluing the wiper rubber 17 to the bending member 1 the layer 14 of anti-corrosion material may have a plane surface as described hereinabove.

According to the embodiment shown in this FIG. 5, the bending member 1 has a first width 26 greater than a second width 36 of the heel-piece 19 of the wiper rubber 17. This first width 26 is measured between the two longitudinal edge surfaces 7 of the bending member 1 parallel to the axis Oy of the orthonormal system of axes shown in the figure. In the same manner, the second width 36 of the heel-piece 19 of the wiper rubber 17 is measured parallel to that axis Oy.

Thanks to this difference in dimensions between these widths, two protrusions 27 of the air deflector 16 are able to come to grip the bending member 1, thus facilitating its retention in position.

On all of these wiper blades, the bending member 1 is terminated longitudinally by at least one end-piece. The end-piece(s) enable(s) termination and protection of the longitudinal end or ends of those bending members 1. Each wiper blade 29 therefore advantageously has two end-pieces disposed at respective longitudinal ends.

The bending member 1 according to the present invention therefore includes an intermediate portion 2 having a first thickness 12 and two lateral portions 3a, 3b each having a second thickness 13. That second thickness 13 is identical for each of the lateral portions 3a, 3b over all the length of the bending member 1 and is less than the first thickness 12 of the intermediate portion 2.

The intermediate portion 2 therefore enables improvement of the flexibility of the wiper blade 29 into which the bending member or members 1 may be integrated, while the constant dimension of the lateral portions 3a, 3b enables standardization of the connectors 15, simplifying the production, management and logistics of such parts.

FIG. 6 shows a set 35 of wiper blades 29 according to the present invention. That set 35 includes at least two wiper blades 29 with different lengths and each including at least one bending member 1, a connector 15 and a wiper rubber 17. These wiper blades 29 may be displayed in two distinct packages 34 as shown in FIG. 6 or, according to a variant embodiment not shown here, in one and the same package 34, in particular in the case of a wiper blade intended for the driver side and a wiper blade intended for the passenger side.

The set 35 comprises at least one first, long wiper blade 29 having a length greater than 650 mm and at least one second, short wiper blade 29 having for its part a length less than 650 mm. The lengths of these wiper blades 29 are measured in the direction of longitudinal extension of the bending members 1 integrated into these wiper blades 29.

As described above, these bending members 1 enable generation of a curvature of the wiper blade 29 therefore ensuring effective wiping of the glazed surface equipped with these wiper blades 29. Each of the wiper blades 29 of the set 35 according to the present invention includes at least one bending member 1 the shape of which is matched to the length of the wiper blade 29 into which it is integrated.

The first wiper blade 29 therefore includes a bending member 1 having a globally rectangular section seen in cross section whereas the second wiper blade 29 includes a bending member 1 according to the present invention, that is to say the thickness of which measured at the center is less than the thickness measured at least one of these edges.

As shown in FIG. 6, each of these bending members 1 has two lateral portions 3a, 3b and the intermediate portion 2. The lateral portions 3a, 3b of these bending members 1 are identical in order to enable the use of a standardized connector as mentioned above.

The lateral portions 3a and 3b of the bending member 1 integrated into the first wiper blade 29 have a thickness measured along the axis Oz substantially identical to the thickness of its intermediate portion 2 measured along the same axis Oz.

When the wiper blade 29 is long, as in the case for the first wiper blade 29 of the set 35, it is necessary to choose a so-called "classic" bending member 1 that enables stiffening of the wiper blade 29. On the other hand, when the wiper blade 29 is short, as is the case for the second wiper blade 29 of the set 35, a bending member 1 according to the present invention is more appropriate because it enables adaptation of the flexibility of that wiper blade 29.

The thicknesses of the lateral portions 3a and 3b of the first and second wiper blades 29 constituting the set 35 are identical, apart from the manufacturing tolerance. A same connector 15 product code can therefore be used for the assembly of these two wiper blades 29.

However, the invention should not be seen as limited to the means and configurations described and shown here, and equally encompasses all equivalent means or configurations and any technically operative combination of such means. In particular, the shape and the dimensions of the bending member 1 may be modified without comprising the invention provided that they have the functionalities described in the present document.

The invention claimed is:

1. A vehicle wiper blade comprising:
   at least one wiper rubber configured to come to bear on a glazed surface; and
   at least one bending member housed in a support,
   wherein the at least one wiper rubber is retained by the support, the bending member being configured to generate a curvature of the wiper blade, the bending member being in a form of a longitudinally extending strip, the strip including, seen in cross section, an intermediate portion disposed between two lateral portions of the strip, a first thickness of the intermediate portion is less than a second thickness of at least one of the lateral portions,
   wherein the intermediate portion of the bending member is delimited by a first face that has a profile, seen from an exterior of the bending member, that is flat or concave,
   wherein the bending member includes at least one transition regularly disposed between the intermediate portion and at least one of the lateral portions, the at least one transition being a step formed by two right angle bends when the first face is flat, or a progressive extension of the concave profile of the first face when the first face is concave,
   wherein at least one lateral portion of the bending member includes a longitudinal edge surface of the strip, two tops and two chamfers that connect each top to the longitudinal edge surface, and
   wherein at least one of the two tops are edges connecting at least one transition and at least one of the two chamfers.

2. The wiper blade as claimed in claim 1, wherein the first thickness of the intermediate portion of the strip is less than the second thickness of each of the lateral portions.

3. The wiper blade as claimed in claim 1, wherein the intermediate portion of the bending member is delimited by a second face opposite the first face with respect to a first plane of symmetry passing through a center of the first thickness, the second face having a concave profile seen from the exterior of the bending member when the first face is concave.

4. The wiper blade as claimed in claim 3, wherein the strip has a symmetry of shapes with respect to the first plane of symmetry that intersects the strip within its thickness.

5. The wiper blade as claimed in claim 3, wherein the strip has a symmetry of shapes with respect to a second plane of symmetry perpendicular to the first plane of symmetry and passing through the center of the first thickness.

6. The wiper blade as claimed in claim 1, wherein the second thickness is identical at each of the two lateral portions of the strip.

7. The wiper blade as claimed in claim 1, wherein the bending member includes a layer of an anti-corrosion material that extends transversely over the strip at least between the two lateral portions.

8. The wiper blade as claimed in claim 7, wherein the layer surrounds the strip.

9. The wiper blade as claimed in claim 8, wherein the layer is delimited by a plane surface.

10. The wiper blade as claimed in claim 7, wherein the layer fills a cavity generated by a difference between the second thickness and the first thickness.

11. The wiper blade as claimed in claim 1, including only a single bending member.

12. A vehicle wiper blade comprising:
    at least one wiper rubber configured to come to bear on a glazed surface; and
    at least one bending member housed in a support,
    wherein the at least one wiper rubber is retained by the support, the bending member being configured to generate a curvature of the wiper blade, the bending member being in a form of a longitudinally extending strip, the strip including, seen in cross section, an intermediate portion disposed between two lateral portions of the strip, a first thickness of the intermediate portion is less than a second thickness of at least one of the lateral portions,
    wherein a heating film is applied to the bending member,
    wherein the intermediate portion of the bending member is delimited by a first face that has a profile, seen from an exterior of the bending member, that is flat or concave,
    wherein the bending member includes at least one transition regularly disposed between the intermediate portion and at least one of the lateral portions, the at least one transition being a step formed by two right angle bends or a progressive extension of the concave profile of the first face,
    wherein at least one lateral portion of the bending member includes a longitudinal edge surface of the strip, two tops and two chamfers that connect each top to the longitudinal edge surface, and
    wherein at least one of the two tops are edges connecting at least one transition and at least one of the two chamfers.

* * * * *